US012768432B2

(12) United States Patent
Yamamoto

(10) Patent No.: US 12,768,432 B2
(45) Date of Patent: Oct. 20, 2026

(54) ELECTRONIC KEY OPERATING DEVICE

(71) Applicant: YOKOWO CO., LTD., Tokyo (JP)

(72) Inventor: Tsugio Yamamoto, Tokyo (JP)

(73) Assignee: YOKOWO CO., LTD., Tokyo (JP)

( * ) Notice: Subject to any disclaimer, the term of this patent is extended or adjusted under 35 U.S.C. 154(b) by 30 days.

(21) Appl. No.: 18/714,372

(22) PCT Filed: Sep. 27, 2022

(86) PCT No.: PCT/JP2022/035879
§ 371 (c)(1),
(2) Date: May 29, 2024

(87) PCT Pub. No.: WO2023/100456
PCT Pub. Date: Jun. 8, 2023

(65) Prior Publication Data

US 2025/0020193 A1 Jan. 16, 2025

(30) Foreign Application Priority Data

Nov. 30, 2021 (JP) ................................ 2021-195018

(51) Int. Cl.
*F16H 21/44* (2006.01)
*B60R 25/24* (2013.01)

(52) U.S. Cl.
CPC .............. *F16H 21/44* (2013.01); *B60R 25/24* (2013.01)

(58) Field of Classification Search
CPC ......... F16H 21/44; B60R 25/24; B60R 25/10; B60R 25/34
USPC ............................................................. 70/57
See application file for complete search history.

(56) References Cited

U.S. PATENT DOCUMENTS

| | | | | |
|---|---|---|---|---|
| 12,194,958 | B2 * | 1/2025 | Yamamoto | B60R 25/24 |
| 2007/0273534 | A1 * | 11/2007 | McGinn | G07C 9/00174 340/572.8 |
| 2013/0106569 | A1 * | 5/2013 | McGinn | E05B 19/0005 340/5.52 |
| 2020/0299998 | A1 * | 9/2020 | Testa | G07C 9/00174 |
| 2021/0241552 | A1 * | 8/2021 | Jonely | G07C 9/00944 |
| 2022/0172541 | A1 * | 6/2022 | Takahashi | G07C 9/00912 |
| 2022/0314932 | A1 * | 10/2022 | Yamamoto | E05B 49/00 |

FOREIGN PATENT DOCUMENTS

| | | | | |
|---|---|---|---|---|
| DE | 102005059061 | A1 * | 6/2007 | G07C 9/00182 |
| EP | 3819877 | A2 * | 5/2021 | H01M 50/216 |
| EP | 3912869 | A1 * | 11/2021 | B60R 25/34 |
| JP | 2019-512630 | A | 5/2019 | |
| JP | 6710832 | B1 * | 6/2020 | |
| JP | 2021167151 | A * | 10/2021 | |
| WO | WO-2017168341 | A1 * | 10/2017 | |
| WO | 2021/054404 | A1 | 3/2021 | |

* cited by examiner

*Primary Examiner* — Nathan Cumar
(74) *Attorney, Agent, or Firm* — XSENSUS LLP

(57) ABSTRACT

An electronic key operation device includes: an accommodation unit configured to accommodate an electronic key; a pressing member configured to press a button of the electronic key accommodated in the accommodation unit; an actuator configured to apply power for pressing the button to the pressing member, and a position setting part configured to set a relative position between the actuator and the pressing member and set a position of the pressing member so as to correspond to a position of the button.

19 Claims, 14 Drawing Sheets

ELECTRONIC KEY OPERATING DEVICE

CROSS-REFERENCE TO RELATED APPLICATIONS

The present application is based on PCT filing PCT/JP2022/035879, filed Sep. 27, 2022, which claims priority from Japanese Patent Application No. 2021-195018, filed Nov. 30, 2021, the disclosure of each are incorporated herein in its entirety by reference.

TECHNICAL FIELD

The present invention relates to an electronic key operation device (operating device), and more particularly, to an electronic key operation device (operating device) for operating an accommodated electronic key from outside.

BACKGROUND ART

For example, as usage forms of an automobile, there is a form in which a plurality of persons share one or a plurality of vehicles. This corresponds to car sharing and rental cars. Hereinafter, such usage forms are collectively referred to as "sharing".

In sharing, handling of a key for using a vehicle to be shared is important. For example, Patent Literature 1 discloses a storage case of an electronic key for receiving and delivering an electronic key in an unattended manner in sharing. In the invention of Patent Literature 1, communication is performed from outside the vehicle using a smartphone or the like with a storage case in the vehicle in which an electronic key is stored. Further, when a button of the electronic key in the vehicle is operated from outside the vehicle, a door lock of an automobile is unlocked and the electronic key in the vehicle can be received.

CITATION LIST

Patent Literature

Patent Literature 1: WO 2021/054404

SUMMARY OF INVENTION

Technical Problem

In the electronic key storage case described in Patent Literature 1, it is necessary to change an arrangement of a pressing portion that presses a button and an actuator and a shape of a storage space of the electronic key according to the button and an outer shape of the electronic key. Therefore, it is necessary to design and manufacture the storage case according to various electronic keys existing in the world, and/or it is necessary to increase a size of a housing of the storage case.

Accordingly, an object of the invention is to provide an electronic key operation device that can be used by a design change of a minimum limit for various electronic keys and can be reduced in size.

Solution to Problem

In order to solve the above problem, according to an aspect of the invention, there is provided an electronic key operation device including: an accommodation unit configured to accommodate an electronic key; a pressing member configured to press a button of the electronic key accommodated in the accommodation unit; an actuator configured to apply power for pressing the button to the pressing member; and a position setting part configured to set a relative position between the actuator and the pressing member and set a position of the pressing member so as to correspond to a position of the button.

According to the electronic key operation device of the invention, since the position of the pressing member can be set by the position setting part while the position of the actuator is fixed, the position of the pressing member and the position of the button of the electronic key can be easily matched. Accordingly, the electronic key operation device can be used by a design change of the minimum limit for various electronic keys. In addition, since it is not necessary to change the position of the actuator according to the position of the button of the electronic key, it is not necessary to change a shape of a housing of the electronic key operation device, and it is not necessary to secure a space inside for changing the position of the actuator, so that it is possible to reduce the size.

BRIEF DESCRIPTION OF DRAWINGS

FIG. 10 shows a position setting part of an electronic key operation device according to another embodiment, and in the embodiment, the position setting part is provided in the intermediate member in the embodiment shown in FIG. 3 and the like.

DESCRIPTION OF EMBODIMENTS

The invention will be specifically described with reference to the following embodiments, but the present invention is not limited thereto. When there is no particular detailed reference to each device, mechanism, means, and the like described in the present specification, those skilled in the art can use known mechanical devices, mechanisms, means, and the like. The respective embodiments can be combined based on ordinary knowledge by those skilled in the art, and configurations not specifically described in the respective embodiments can have the same configurations as the other embodiments or configurations suitable for the embodiments. In a cross-sectional view, a cross section of each member is represented by various oblique lines for easy discrimination from other members, but a difference in oblique lines does not represent a difference in material, shape, or the like of the member. Also in a perspective view, each member is represented by a color or a dot in order to be easily distinguished from other members, but this difference does not represent a difference in material, shape, or the like of the member.

First Embodiment

Figure 1:
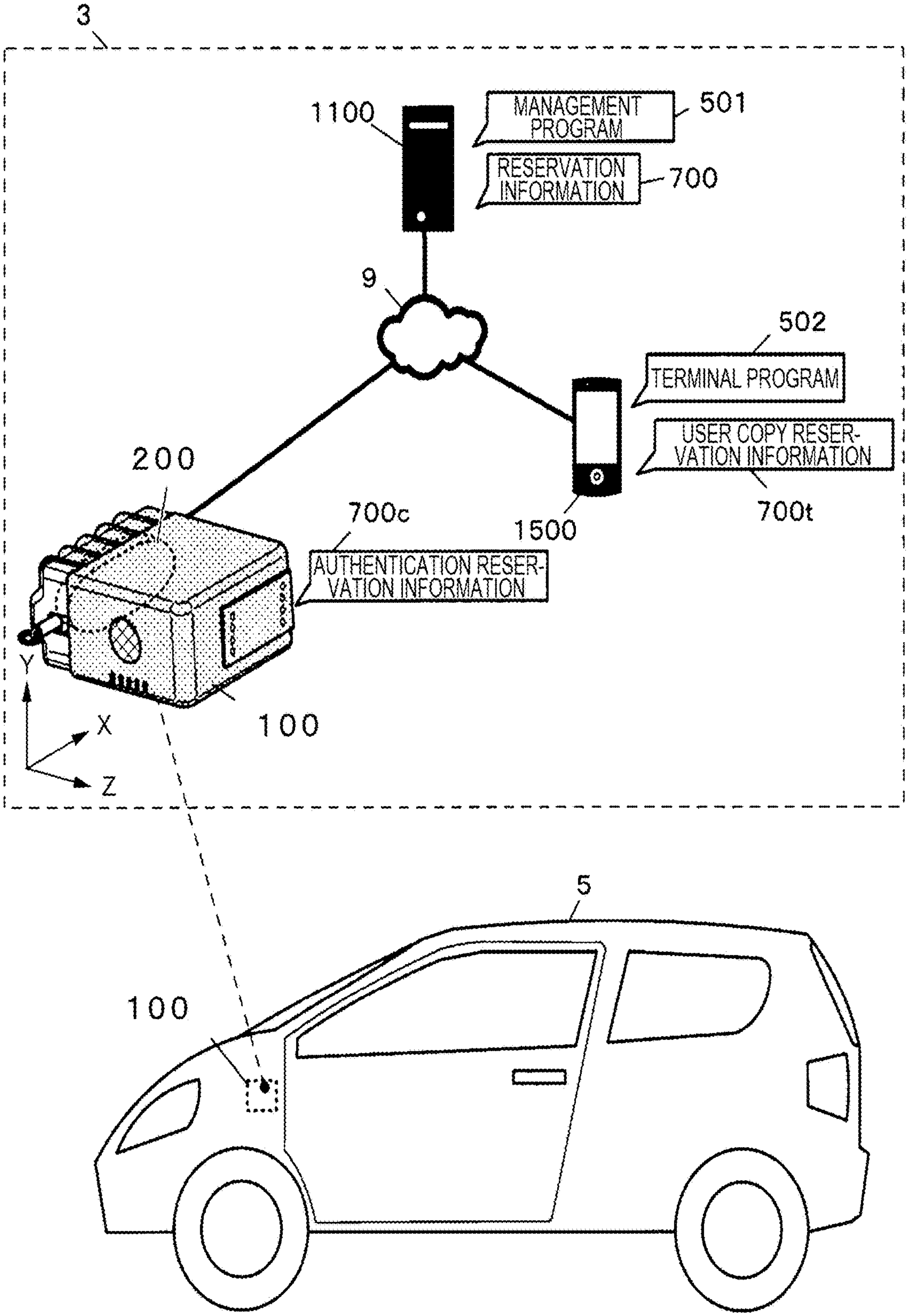
FIG. 1 shows an example of a system configuration of a sharing system.

FIG. 1 is a schematic diagram showing a system configuration example of a sharing system using an electronic key operation device according to the invention.

A sharing system 3 includes a vehicle 5 to be shared, an electronic key operation device 100 that is an in-vehicle device accommodating a genuine electronic key 200 attached to the vehicle 5, a server system 1100 that performs communication connection with the electronic key operation device 100 via a network 9, and a user terminal 1500 that is used by a user to be shared and performs communication connection with the electronic key operation device 100 via the network 9. One electronic key operation device 100 is mounted on the vehicle 5. In order to actually operate the sharing system 3, one or a plurality of sets of the vehicle 5 and the electronic key operation device 100 are prepared, and a plurality of user terminals 1500 are used.

The electronic key 200 includes an unlocking button and a locking button which are pressing buttons for unlocking or locking a locking mechanism provided in the vehicle 5 to be shared. The electronic key 200 transmits a predetermined unlocking signal when the unlocking button is pressed, and transmits a predetermined locking signal when the locking button is pressed. The network 9 means a communication path through which data communication is possible. A communication method may be wired or wireless.

The server system 1100 performs user registration of the sharing system 3, reservation management, and provision of reservation information to the user terminal 1500 and the electronic key operation device 100. Specifically, by storing and executing a management program 501, the server system 1100 implements (1) a user registration function, (2) a reservation setting function for each vehicle 5, (3) a function of generating reservation information 700 (for example, including a unique reservation ID, a reserved vehicle ID, a reservation period, and a password), (4) a function of providing a copy of the reservation information 700 (reservation information 700*t*) to the user terminal 1500, and (5) a function of providing a copy of the reservation information 700 (reservation information 700*c*) to the electronic key operation device 100.

The user terminal 1500 is a computer system connectable to the network 9, which is used by the user, and is implemented by, for example, a smartphone, a tablet computer, a notebook computer, or a wearable computer.

The user terminal 1500 can store and execute an application program. As the application program, a terminal program 502 is stored. The terminal program 502 implements (1) a function of accessing the server system 1100, (2) a function of performing a predetermined unlocking request to the electronic key operation device 100 according to an unlocking operation by a user and providing the reservation information 700*t* to unlock the electronic key operation device 100, and (3) a function of making a communication connection with the electronic key operation device 100 according to a locking operation by a user to perform a predetermined locking request, and providing the reservation information 700*t* to lock the electronic key operation device 100.

An arrow indicating a first direction X, a second direction Y, or a third direction Z indicates that a direction from a base end to a tip end of the arrow is a positive direction of a direction indicated by the arrow, and a direction from the tip end to the base end of the arrow is a negative direction of the direction indicated by the arrow. The first direction X is parallel to an insertion and removal direction of the electronic key accommodation case 300 with respect to the electronic key operation device 100. A positive direction of the first direction X is an insertion direction of the electronic key accommodation case 300. A negative direction of the first direction X is a removal direction of the electronic key accommodation case 300. The second direction Y is orthogonal to the first direction X and parallel to a thickness direction of the electronic key operation device 100. A positive direction of the second direction Y is a direction from below to above the electronic key operation device 100. A negative direction of the second direction Y is a direction from above to below the electronic key operation device 100. The third direction Z is orthogonal to both the first direction X and the second direction Y. The third direction Z is parallel to a depth direction of the electronic key operation device 100. A positive direction of the third direction Z is a direction from a side of the electronic key operation device 100 on which the electronic key accommodation case 300 is attached toward a side opposite to the attachment side. A negative direction of the third direction Z is a direction from the side of the electronic key operation device 100 opposite to the side on which the electronic key accommodation case 300 is attached toward the side on which the electronic key operation device 100 is attached. The first direction X, the second direction Y, and the third direction Z in the drawings are also referred to as a horizontal direction, a thickness direction, and a vertical direction, respectively.

Figure 2:
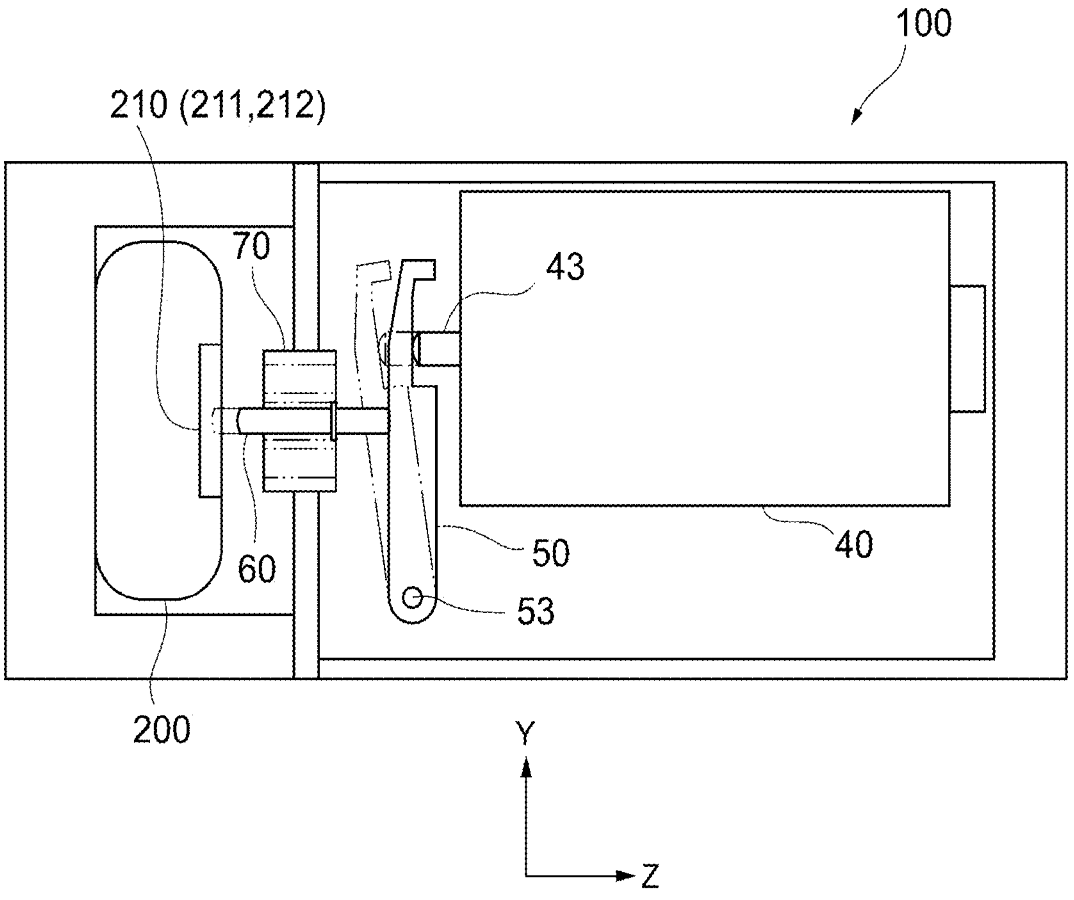
FIG. 2 conceptually shows an operation of an electronic key operation device according to one embodiment.
Figure 3:
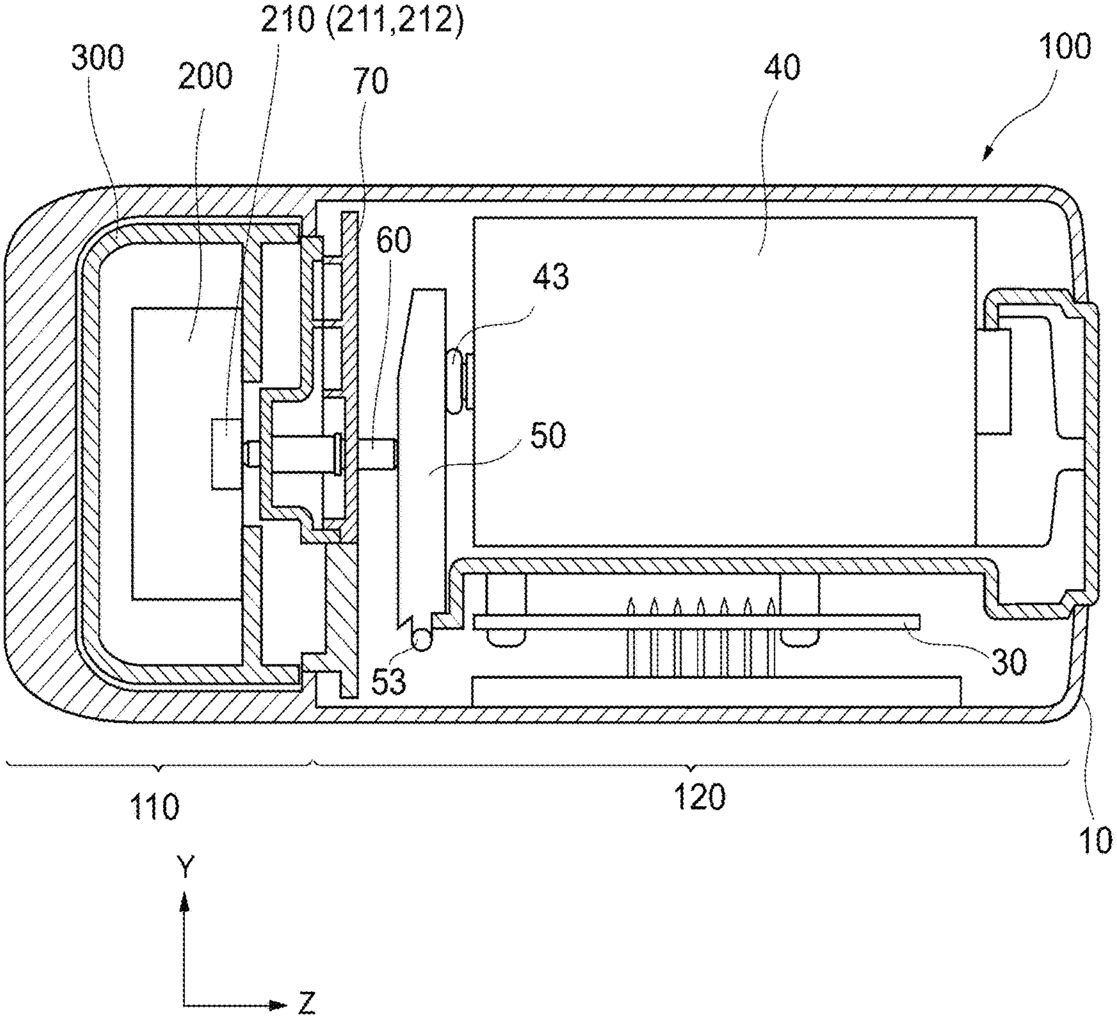
FIG. 3 conceptually shows an X-axis cross section of a structure of the electronic key operation device according to the embodiment.
Figure 4:
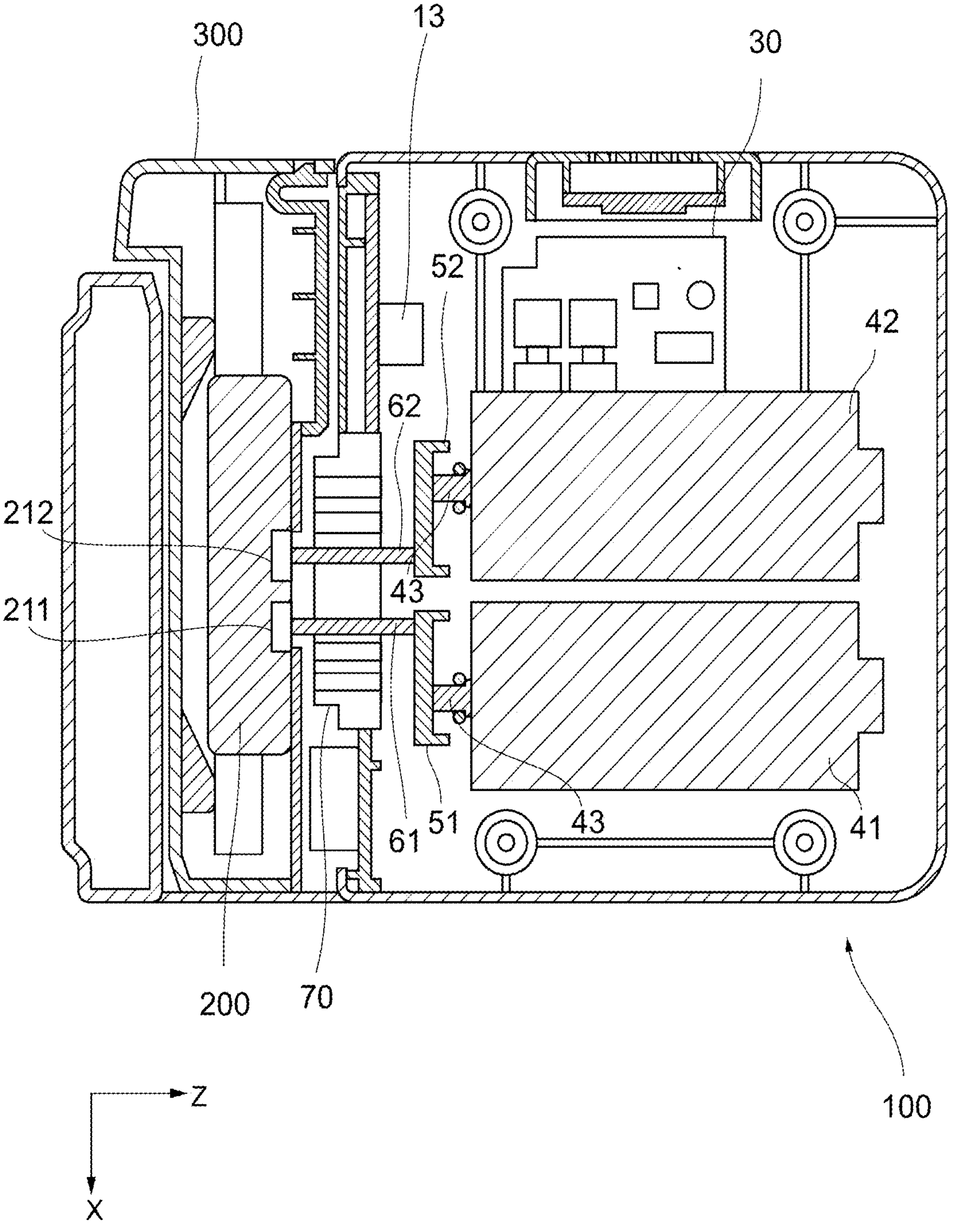
FIG. 4 conceptually shows a Y-axis cross section of the structure of the electronic key operation device according to the embodiment.
Figure 5A:
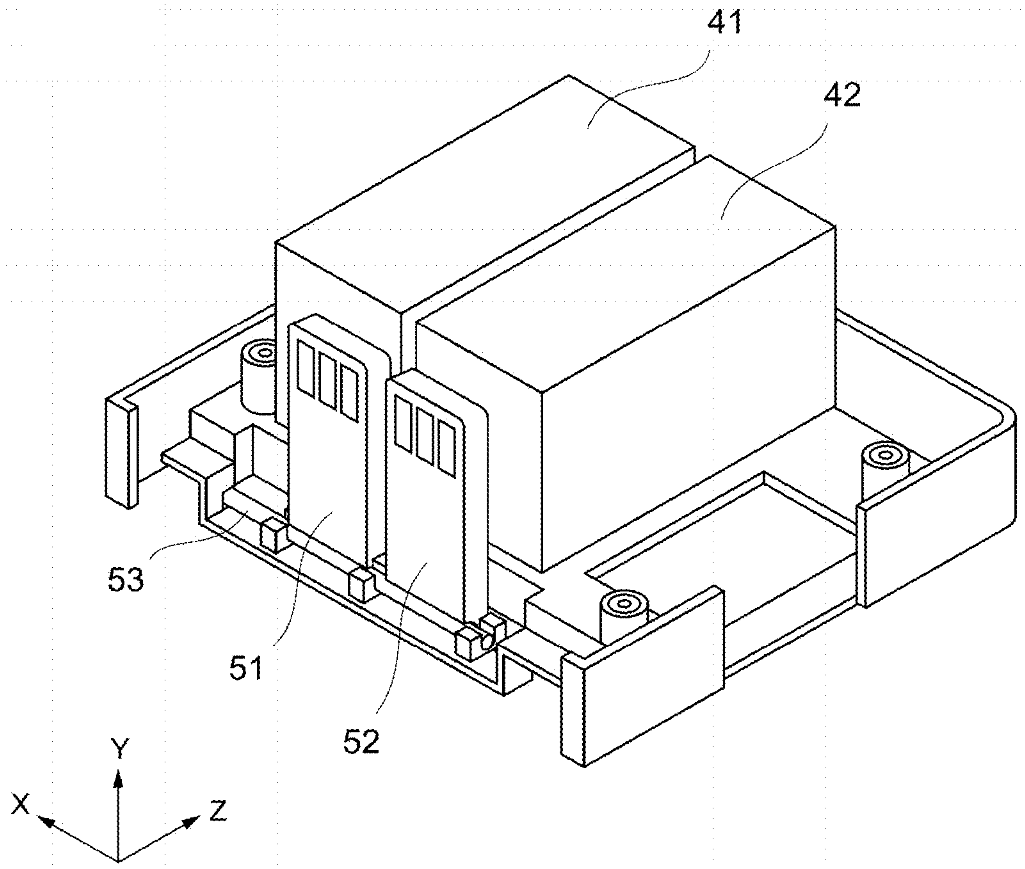
FIG. 5A is a perspective view showing only a part of an actuator, an intermediate member, and a housing of the electronic key operation device.
Figure 5B:
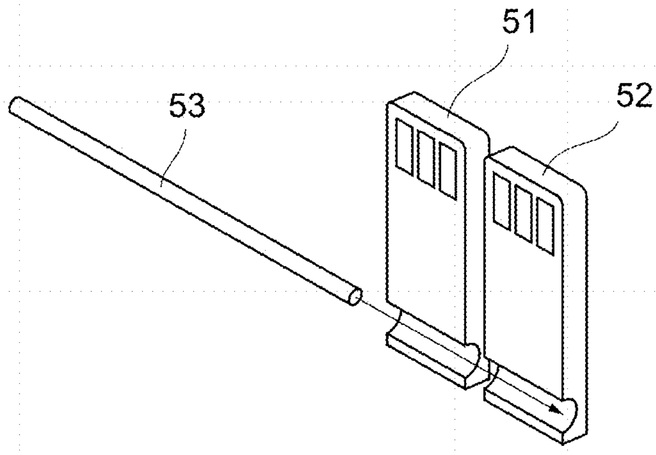
FIG. 5B is a perspective view showing only the intermediate member and a rotary shaft.
Figure 6A:
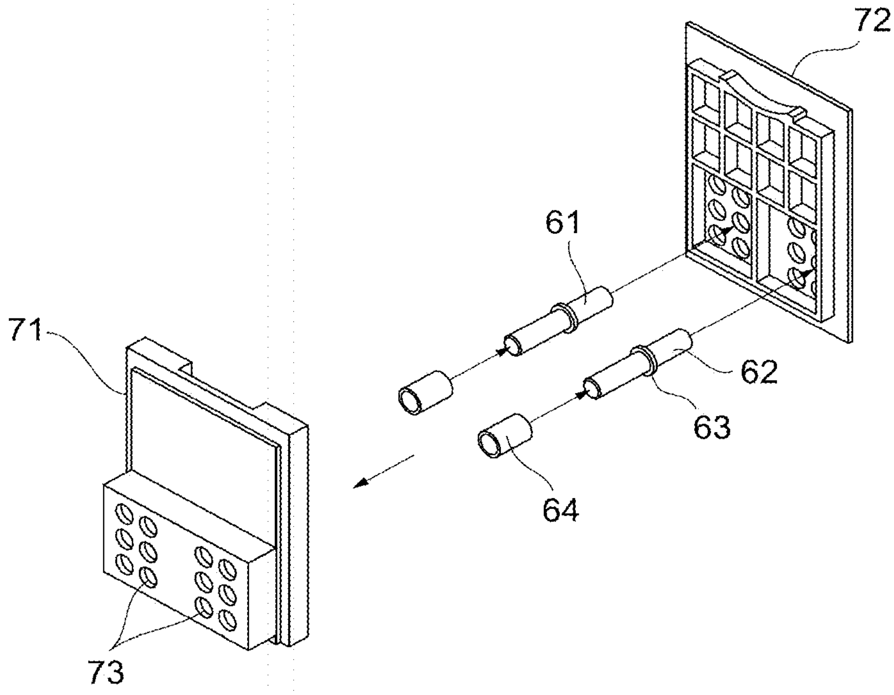
FIG. 6A is an exploded view of a pressing member and a position setting part.
Figure 6B:
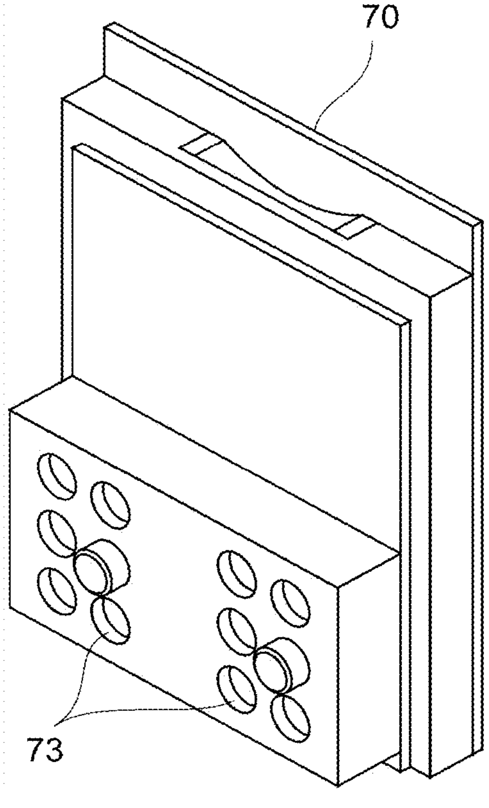
FIG. 6B is an assembly diagram thereof.

FIG. 2 conceptually shows an operation of the electronic key operation device 100 according to a first embodiment. FIGS. 3 and 4 conceptually show a structure of the electronic key operation device 100 according to the first embodiment. FIG. 5A is a perspective view showing only the structure of an actuator 40 (hereinafter, referred to as the actuator 40 when first and second actuators 41 and 42 are not distinguished from each other), an intermediate member 50 (hereinafter, referred to as the intermediate member 50 when first and second intermediate members 51 and 52 are not distinguished from each other), and a part of a housing 10 in the electronic key operation device 100 according to the first embodiment, and FIG. 5B is a perspective view showing only the structure of the intermediate member 50 and a rotary shaft 53. In addition, FIG. 6A is an exploded view of a pressing member 60 (hereinafter, referred to as the pressing member 60 when first and second pressing members 61 and 62 are not distinguished) and a position setting part 70 according to the first embodiment, and FIG. 6B is an assembly diagram thereof.

First, the operation of the electronic key operation device 100 according to the first embodiment will be described with reference to FIG. 2. The electronic key operation device 100 includes the actuator 40, the intermediate member 50 having the rotary shaft 53, the pressing member 60, and the position setting part 70 that holds the pressing member 60.

The intermediate member 50 to which power is transmitted from the actuator 40 moves around the rotary shaft 53, and can indirectly transmit the power from the actuator 40 to the pressing member 60. The pressing member 60 to which a force is transmitted from the intermediate member 50 can slide in the position setting part 70 and press a button 210 of the electronic key 200 (hereinafter, referred to as the button 210 when a door unlocking button 211 and a door locking button 212 are not distinguished from each other).

After the pressing member 60 presses the button 210 of the electronic key 200 and the power of the actuator 40 stops, the pressing member 60 returns to an original position by a return mechanism and the intermediate member 50 returns to an original position by being pressed by the pressing member 60. A movable portion of the actuator 40 is pressed by the intermediate member 50 and/or can be returned to the original position by another return mechanism.

Next, the structure and functions of each component of the first embodiment will be described in detail with reference to FIGS. 3 to 7.

As shown in FIGS. 3 and 4, the electronic key operation device 100 includes an electronic key accommodator 110 and an operation mechanism portion 120.

The electronic key accommodator 110 accommodates the electronic key 200. The electronic key accommodator 110 accommodates the electronic key 200 in a state in which the button 210 of the electronic key 200 faces the pressing member 60 side in the operation mechanism portion 120. In the first embodiment, the electronic key 200 is accommodated in the electronic key accommodator 110 in a state of being stored in the electronic key accommodation case 300.

The operation mechanism portion 120 is a mechanical structure portion for pressing the button 210 of the electronic key 200, and includes a control unit 30, the actuator 40 that receives a signal from the control unit 30, the intermediate member 50 that receives the power from the actuator 40, and the pressing member 60 that receives the power from the intermediate member 50, in the housing 10.

The control unit 30 includes electronic components such as a CPU, an IC memory, a wireless communication module, a power control circuit, an interface IC, and an in-vehicle network communication IC, and/or various circuits, and can integrally control the operation of the electronic key operation device 100. In addition, the electronic key operation device 100 can be connected to the network 9 by the wireless communication module of the control unit 30.

In FIGS. 3 and 4, the control unit 30 is adjacent to the actuator 40 in the horizontal direction and extends in the horizontal direction and the vertical direction, but a position and a direction of the control unit 30 are not particularly limited to those in this embodiment as long as the control unit 30 can exert a function thereof.

The actuator 40 is controlled by the control unit 30 and serves as a driving unit that directly applies the power to the pressing member 60 or indirectly applies the power to the pressing member 60 via the intermediate member 50. Specifically, when an instruction to unlock or lock the electronic key 200 is given to the wireless communication module of the control unit 30 via the network 9, the actuator 40 is controlled by the control unit 30 to push out a movable portion 43.

The actuator 40 may be, for example, an electromagnetic solenoid, specifically, is implemented by a push-type linear solenoid, and can push out the rod-shaped movable portion 43 by an electromagnetic force as a drive current flows.

In the embodiment, the actuator 40 includes the first and second actuators 41 and 42, and can press the door unlocking button 211 and the door locking button 212 by applying the power to the first and second pressing members 61 and 62, respectively. When there are three or more buttons of the electronic key 200 to be operated, three or more actuators 40, three or more intermediate members 50, and three or more pressing members 60 may be provided.

The first and second actuators 41 and 42 are disposed adjacent to each other in the horizontal direction, and can push out the movable portions 43 in the vertical direction (the negative direction of the third direction Z) to transmit the power to the first and second intermediate members 51 and 52.

The intermediate member 50 is a member for transmitting the power from the actuator 40 to the pressing member 60. The intermediate member 50 has appropriate rigidity and structure for this purpose. The use of the intermediate member 50 makes it easier to freely set the arrangement of the actuator 40, the pressing member 60, and the position setting part, which facilitates size reduction of the electronic key operation device 100. In addition, it is easy to appropriately transmit the power from the actuator 40 to the pressing member 60, and it is easy to operate the pressing member 60 perpendicularly to a surface of the button 210 of the electronic key 200.

The intermediate member 50 is not particularly limited as long as it can transmit the power from the actuator 40 to the pressing member 60 and can return to an initial position after transmitting the power to the pressing member 60. For example, the intermediate member 50 may be implemented to move back and forth around the rotary shaft 53, or the intermediate member 50 may be implemented to be slidable in the housing 10.

For example, as shown in FIG. 2, the intermediate member 50 can have a plate-like lever shape having the rotary shaft 53. Here, the intermediate member 50 can move so as to fall in the vertical direction (the negative direction of the third direction Z) by receiving the force from the actuator 40. That is, the intermediate member 50 can move in a circumferential direction around the rotary shaft 53 in a plane in the thickness direction and the vertical direction. Accordingly, the intermediate member 50 transmits the power in the vertical direction received from the actuator 40 to the pressing member 60, and the pressing member 60 can operate in the vertical direction.

When the intermediate member 50 moves around the rotary shaft 53 as in the embodiment, a principle of lever can be applied to the power transmitted from the actuator 40 to the pressing member 60. In this case, the power from the movable portion 43 of the actuator 40 can be used as a force point, the rotary shaft 53 can be used as a fulcrum, and the pressing member 60 can be used as a point of action. With the principle of lever, a moving distance of the movable portion 43 of the actuator 40 for pressing the pressing member 60 is increased, but a pressing force required for the movable portion 43 can be reduced. As a result, a small-sized actuator having a small output can be adopted as the actuator 40, and as a result, the electronic key operation device 100 itself can also be reduced in size.

However, the intermediate member 50 does not need to be provided as long as the power can be directly transmitted from the actuator 40 to the pressing member 60. Further, even if the intermediate member 50 is provided, the intermediate member 50 is not necessarily limited to the illustrated embodiment, and may be a member that operates substantially integrally with the movable portion 43 of the actuator 40 or the pressing member 60.

In the embodiment, the intermediate member 50 includes the first and second intermediate members 51 and 52, and can press the door unlocking button 211 and the door locking button 212 by applying the power to the first and second pressing members 61 and 62, respectively.

The first and second intermediate members 51 and 52 are disposed adjacent to the movable portions 43 of the first and second actuators 41 and 42 in the vertical direction in which the movable portions 43 of the first and second actuators 41 and 42 operate, respectively, and the first and second intermediate members 51 and 52 themselves are disposed adjacent to each other in the horizontal direction.

As shown in FIGS. 5A and 5B, each of the first and second intermediate members 51 and 52 has a rod-shaped pin extending in the horizontal direction at a lower portion in the thickness direction, and the pin serves as a common rotary shaft 53 of the first and second intermediate members 51 and 52. The pin serving as the rotary shaft 53 needs to have high rigidity, and is preferably a rod-shaped pin made of metal.

The pressing member 60 is a member for pressing the button 210 of the electronic key 200, and has an appropriate shape and rigidity for pressing the button 210. The position of the pressing member 60 can be set by the position setting part 70. The pressing member 60 is a member different from the movable portion 43 of the actuator 40 and can move in parallel with a movable direction of the movable portion 43, but a relative position between the pressing member 60 to the actuator 40 is set by the position setting part 70, and as a result, the pressing member 60 normally does not move on the same straight line as the movable direction of the movable portion 43. The pressing member 60 may be held so that its position can be changed by the position setting part 70, or may be held so that its position cannot be changed after the position is set once.

The first and second pressing members 61 and 62 can press the button 210 of the electronic key 200 by receiving the power from the first and second intermediate members 51 and 52 and being pushed out in the vertical direction. In the embodiment, the first and second pressing members 61 and 62 each have a cylindrical pin structure whose longitudinal direction is the vertical direction. Further, in the embodiment, the first and second pressing members 61 and 62 are adjacent to each other in the horizontal direction, but may be adjacent to each other in the thickness direction depending on a mode in which the electronic key 200 is held and an arrangement mode of the buttons.

The positions of the first and second pressing members 61 and 62 can be set in the position setting part 70. Accordingly, the positions of the first and second pressing members 61 and 62 can be set corresponding to the positions of the buttons of various electronic keys.

Specifically, each of the first and second pressing members 61 and 62 is accommodated in one of a plurality of receiving portions 73 of the position setting part 70. Here, the first and second pressing members 61 and 62 are cylindrical pins, and the receiving portions 73 of the position setting part 70 are circular holes into which the pins can be inserted.

The first and second pressing members 61 and 62 are slidable in a state of being accommodated in the receiving portions 73, one ends of the first and second pressing members 61 and 62 press the buttons of the electronic key, and the other ends thereof receive the power for pressing the buttons from the first and second intermediate members 51 and 52.

By sliding the first and second pressing members 61 and 62 in the position setting part 70, a movement of the pressing members 61 and 62 can be made substantially perpendicular to the button 210 of the electronic key 200, and accordingly, the button 210 can be more reliably pressed.

As shown in FIG. 6A, the first and second pressing members 61 and 62 are respectively sandwiched and held by a front portion 71 and a rear portion 72 of the position setting part 70. In this sandwiched space, the first and second pressing members 61 and 62 each have a flange 63, thereby preventing the first and second pressing members 61 and 62 from coming out of the position setting part 70.

The first and second pressing members 61 and 62 can each have a return mechanism 64 made of, for example, a return spring in a space sandwiched by the position setting part 70, and accordingly, after the buttons of the electronic key are pressed and the power of the actuator 40 is stopped, the first and second pressing members 61 and 62 can return to the original positions. In the embodiment, each of the return mechanisms 64 of the first and second pressing members 61 and 62 is sandwiched between the flange 63 and the front portion 71 of the position setting part 70.

In the embodiment, the position setting part 70 includes six receiving portions 73 for setting the position of the pressing member 60 corresponding to the first and second pressing members 61 and 62, respectively. The configuration of the receiving portion 73 is not limited thereto, and may be any configuration that can correspond to the positions of the buttons of various electronic keys.

The position setting part 70 not only sets the position of the pressing member 60 so as to correspond to the position of the button 210 as described above, but also sets the relative position between the actuator 40 and the pressing member 60. "Set the relative position" means that a positional relationship between the actuator 40 and the pressing member 60 can be changed. For example, the position setting part 70 can change the position of the pressing member 60 even when the position of the actuator 40 is fixed.

The position setting part 70 may be a part of other components such as the housing 10, whereas as in the embodiment, the position setting part 70 is preferably an independent separate component. When the position setting part 70 is an independent component, the electronic key operation device 100 can be manufactured by incorporating only the position setting part 70 in which the position of the pressing member 60 is set into the electronic key operation device 100.

Figure 7:
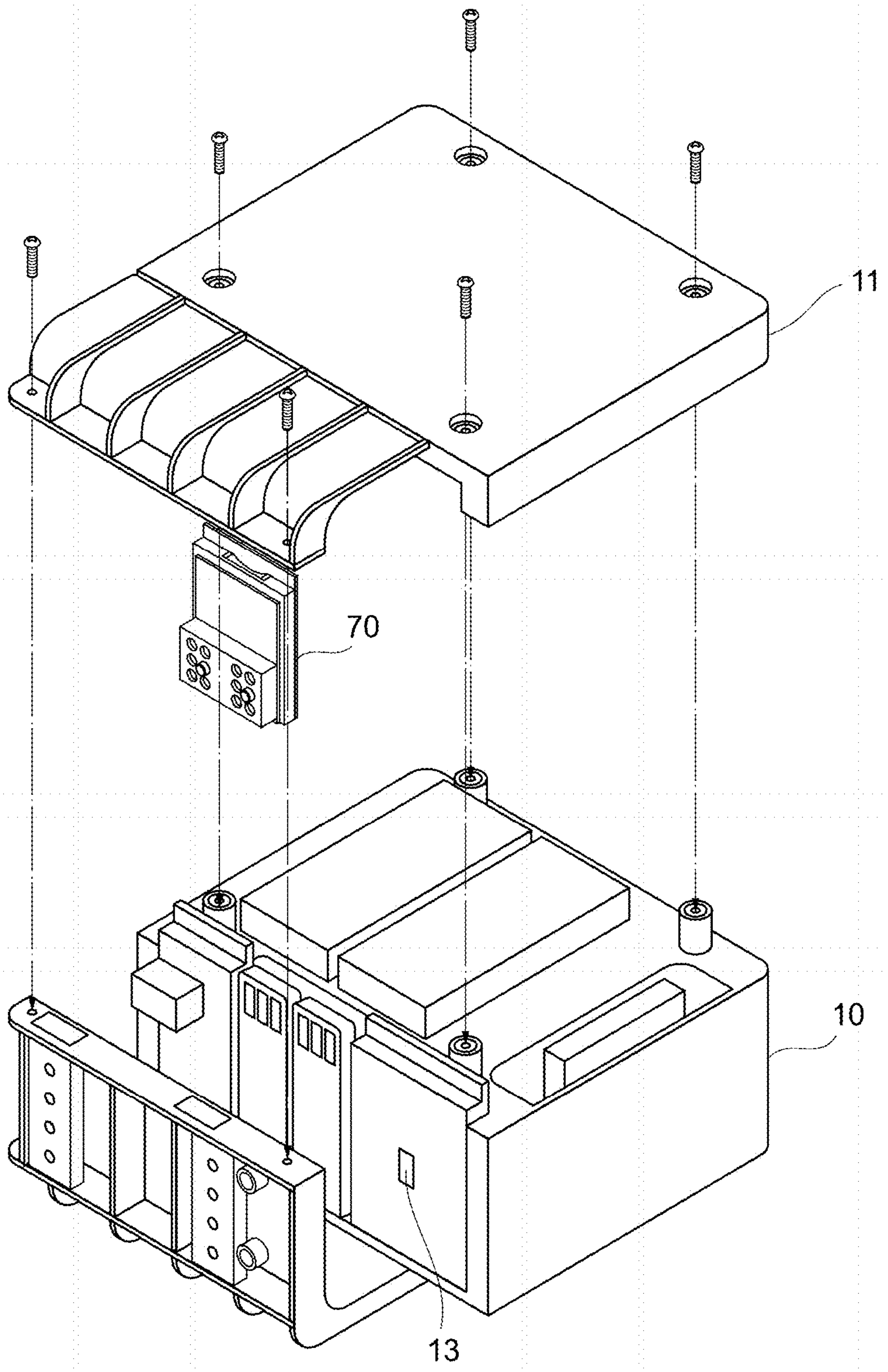
FIG. 7 schematically shows a final assembly process of the electronic key operation device.

For example, as shown in FIG. 7, by assembling a device with respect to parts other than the position setting part 70 and an upper housing 11 of the housing 10, the electronic key operation device 100 can be completed by assembling only the position setting part 70 and the upper housing 11 in which the position of the pressing member 60 is set corresponding to a specific electronic key. Since such a final assembly process is fairly easy, the process can be performed by the user.

The configuration of the housing 10 is not particularly limited as long as the assembly process is easy and each element is easily accommodated.

As shown in FIG. 7, the electronic key operation device 100 may include an accommodation detection part 13 for detecting that the electronic key 200 and/or the electronic key accommodation case 300 is accommodated in the electronic key accommodator 110. The accommodation detection part 13 detects that the electronic key 200 and/or the electronic key accommodation case 300 is accommodated in the electronic key accommodator 110, and outputs a detection signal to the control unit 30. The accommodation detection part 13 may be, for example, a push switch or an optical sensor provided on a side surface of the operation mechanism portion 120 on a Y-axis positive side.

Electric power required for the electronic key operation device 100 may be, for example, supplied from a vehicle side by being connected to an electrical component line of the vehicle, or may be supplied from a built-in battery disposed in the housing 10.

Figure 8:
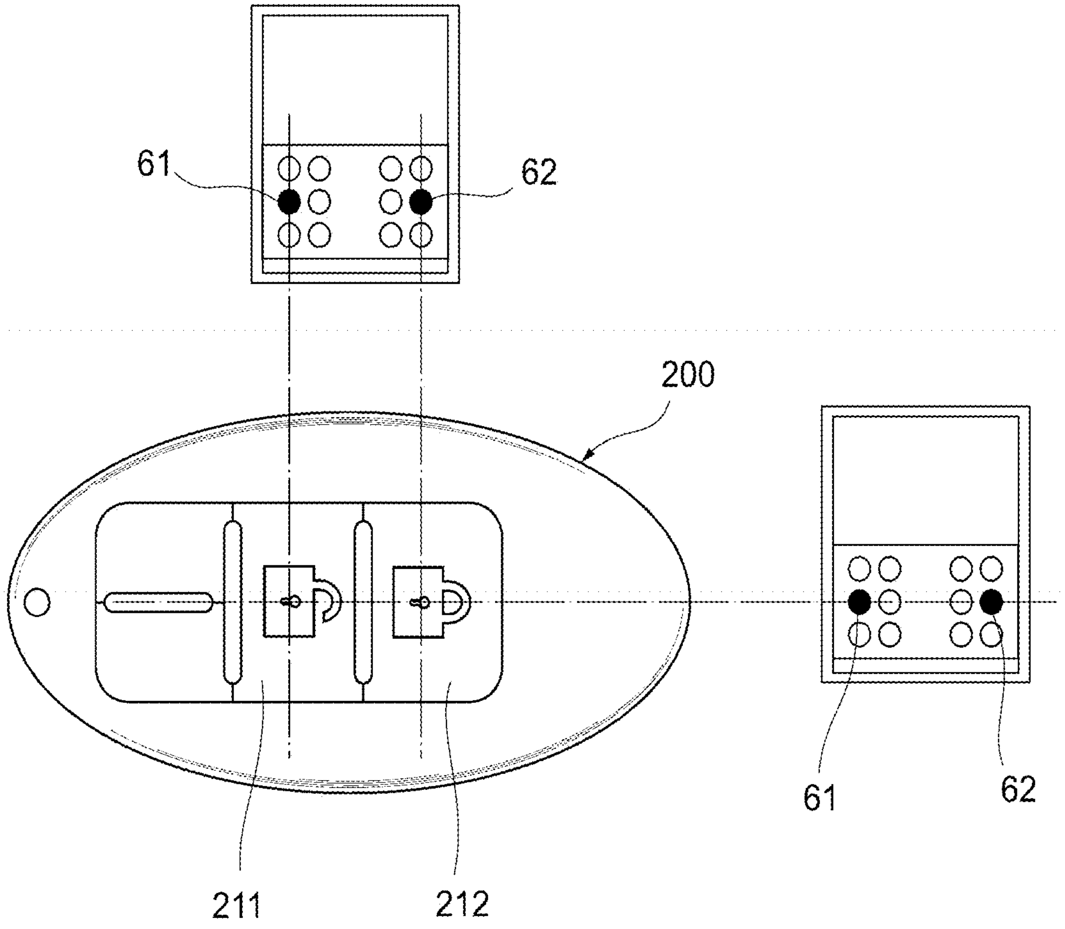
FIG. 8 shows setting positions of first and second pressing members in a position setting part when an unlocking button and a locking button are arranged side by side along a major axis of an electronic key.

FIG. 8 shows setting positions of the first and second pressing members 61 and 62 in the position setting part 70 when the unlocking button 211 and the locking button 212 are arranged side by side along a major axis of the electronic key 200. The position of the first pressing member 61 is set in the position setting part 70 corresponding to the position of the unlocking button 211, and the position of the second pressing member 62 is set in the position setting part 70 corresponding to the position of the locking button 212. In the embodiment, since the unlocking button 211 and the locking button 212 are arranged side by side along the major axis of the electronic key, the positions of the first and second pressing members 61 and 62 are also set in parallel with the major axis of the electronic key correspondingly.

Figure 9:
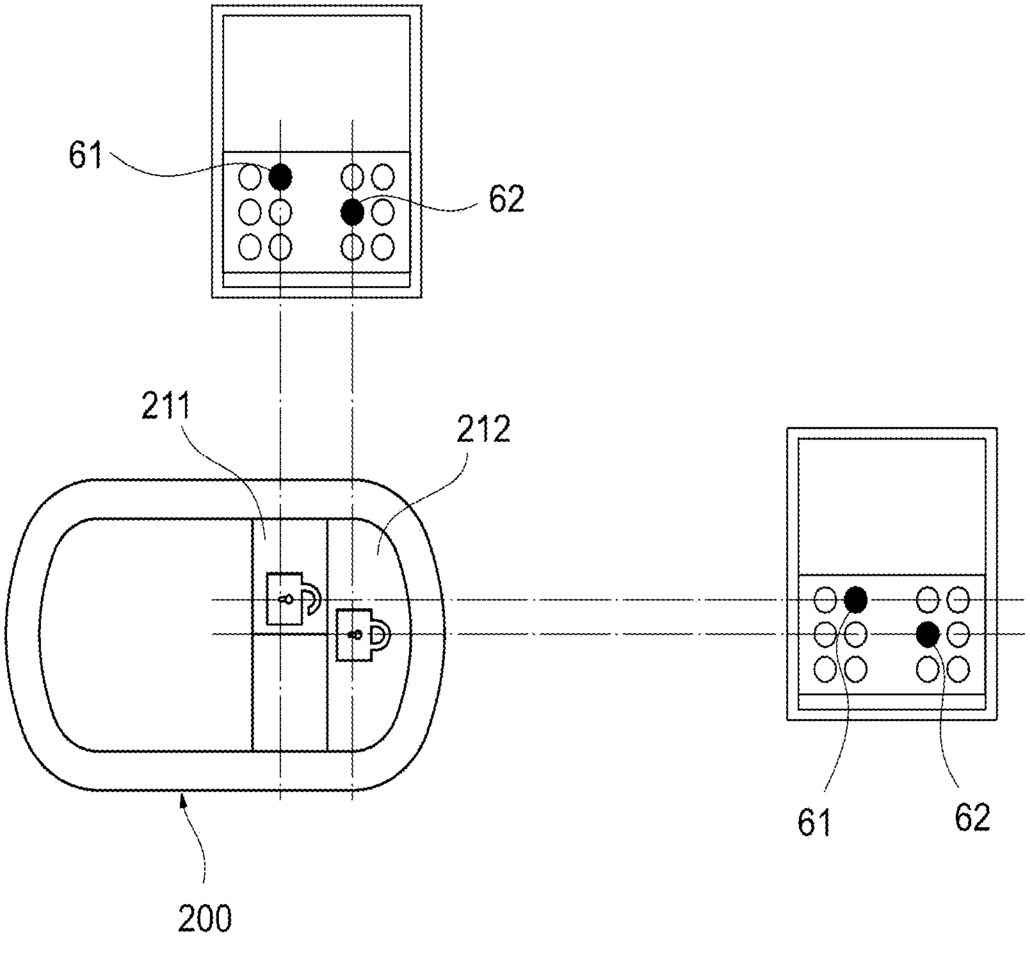
FIG. 9 shows the setting positions of the first and second pressing members in the position setting part when the unlocking button and the locking button are arranged obliquely to the major axis of the electronic key.

In contrast, FIG. 9 shows the setting positions of the first and second pressing members 61 and 62 in the position setting part 70 when the unlocking button 211 and the locking button 212 are arranged obliquely with respect to the major axis of the electronic key 200. In the embodiment, the positions of the first and second pressing members 61 and 62 are also set in an oblique relationship with the major axis of the electronic key corresponding to the positions of the unlocking button 211 and the locking button 212.

In this way, even when the unlocking button 211 and the locking button 212 of the electronic key 200 have various positional relationships, the electronic key operation device 100 can easily correspond to the electronic key only by setting the position of the pressing member 60.

Second Embodiment

A second embodiment relates to an aspect in which the position setting part 70 is provided in the intermediate member 50. The second embodiment can also be said to be a case in which the intermediate member 50 in the first embodiment is not provided.

Figure 10:
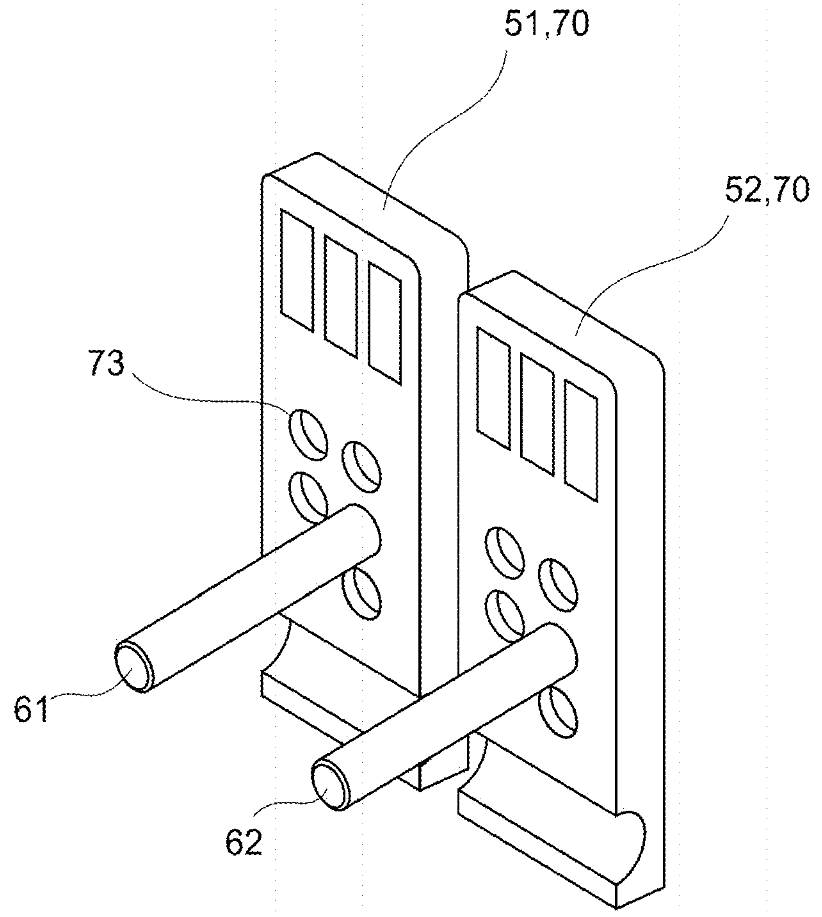

FIG. 10 specifically shows the second embodiment. In the embodiment, the first and second intermediate members 51 and 52 include a plurality of receiving portions 73 for the first and second pressing members 61 and 62, respectively, and the first and second intermediate members 51 and 52 include the position setting part 70. In such an embodiment, although the final assembly process is somewhat complicated as shown in FIG. 7, since the number of components can be reduced, such an embodiment is also useful.

In the embodiment, the first and second pressing members 61 and 62 are fixed by the position setting part 70, and when the first and second intermediate members 51 and 52 having the position setting part 70 operate, the first and second pressing members 61 and 62 also move together.

Figure 11:
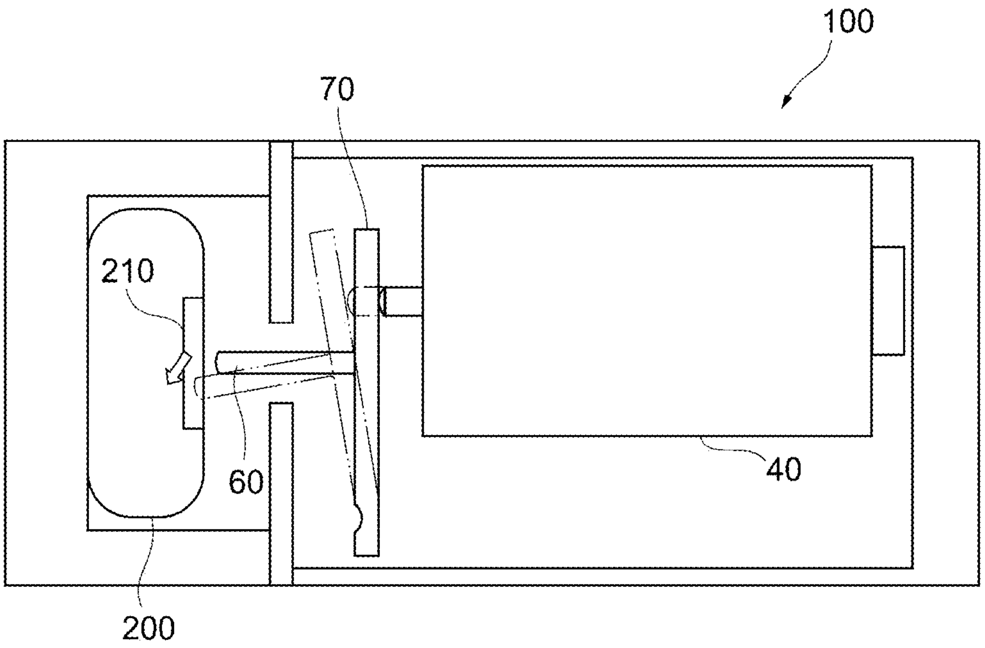
FIG. 11 conceptually shows an operation of the electronic key operation device in the embodiment of FIG. 10.

However, in the embodiment shown in FIG. 10 in which the position setting part 70 is supported only on one side, as shown in FIG. 11, when the power is transmitted from the actuator 40 and the pressing member 60 is about to press the button 210 of the electronic key 200, a force may not be applied perpendicularly to the button 210. This is because, when the electronic key operation device 100 includes various switches and sensors, a distance from the actuator 40 to the electronic key 200 increases, and thus it is particularly difficult to perpendicularly press the button 210 with the pressing member 60.

On the other hand, in the first embodiment, the pressing member 60 can normally and substantially perpendicularly press the button 210 of the electronic key 200, and therefore the first embodiment is preferable from such a point of view.

Third Embodiment

A third embodiment relates to an aspect in which the electronic key 200 is accommodated in the electronic key accommodator 110 of the electronic key operation device 100.

Figure 12:
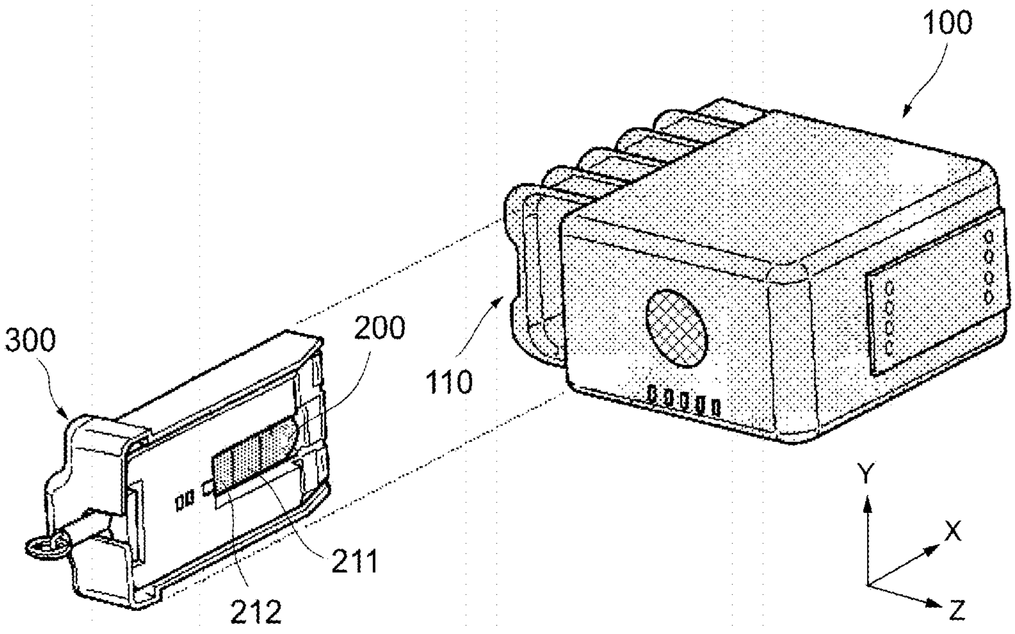
FIG. 12 shows one embodiment in which an electronic key accommodated in a key case is accommodated in an electronic key accommodator of an electronic key operation device.
Figure 13:
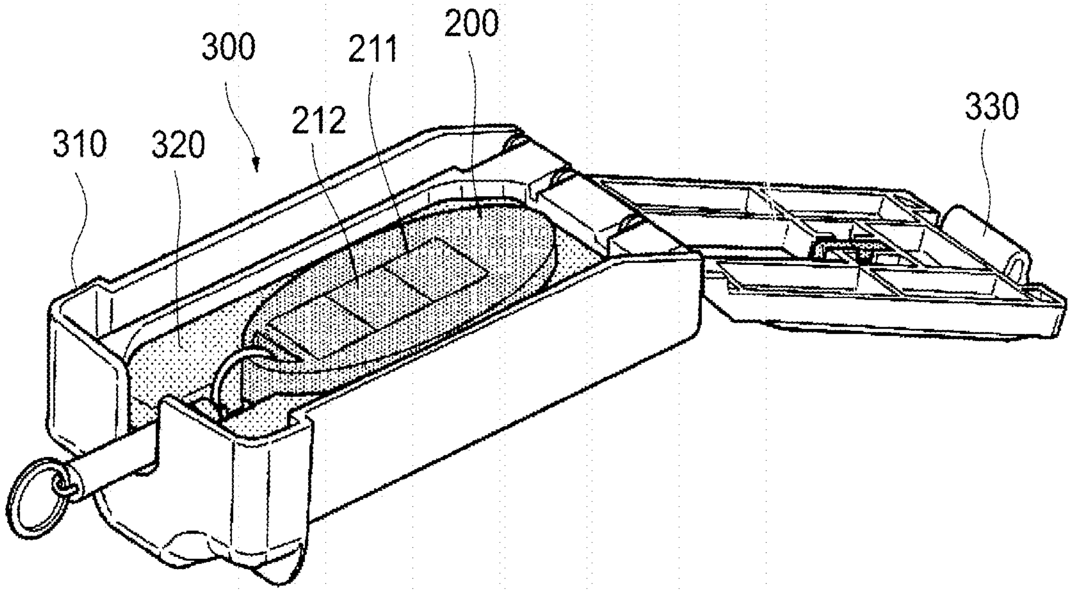
FIG. 13 schematically shows details of the key case used in the embodiment of FIG. 12 in a state in which the electronic key is inserted.

FIG. 12 specifically shows the third embodiment. In the third embodiment, as shown in FIG. 13, the electronic key 200 is inserted into the electronic key accommodator 110 while being stored in the electronic key accommodation case 300.

The electronic key accommodation case 300 includes a storage portion 310 for storing the electronic key 200, a key fitter 320, and a lid portion 330 for opening and closing an opening of the storage portion 310, and stores the electronic key 200 in a removable manner. When the electronic key accommodation case 300 stores the electronic key 200 in a state in which the unlocking button 211 and the locking button 212 of the electronic key 200 are exposed, and accordingly, the electronic key accommodation case 300 is accommodated in the electronic key accommodator 110, the pressing member 60 presses each of the unlocking button 211 and the locking button 212.

The key fitter 320 can have a shape corresponding to an outer shape of the electronic key 200. For example, the key fitter 320 may be a member formed of a hard sponge or the like in which an accommodation range of the electronic key 200 is hollowed out along the outer shape. The key fitter 320 positions the electronic key 200 so that the unlocking button 211 and the locking button 212 of the electronic key 200 are positioned at predetermined positions in the storage portion 310. The key fitter 320 is selected and used according to a type of the electronic key 200 of the vehicle to which the electronic key operation device 100 is attached.

Fourth Embodiment

A fourth embodiment relates to an aspect in which the electronic key 200 is directly accommodated in the electronic key accommodator 110 of the electronic key operation device 100.

Figure 14A:
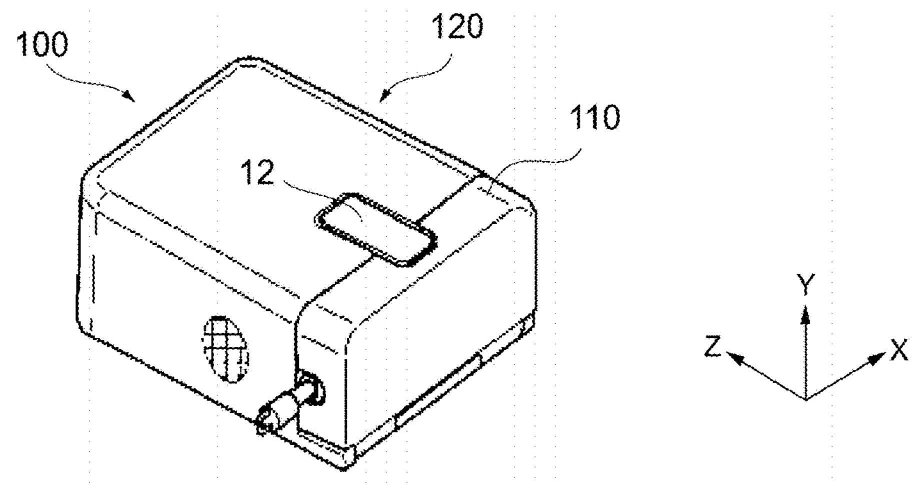
FIGS. 14A to 14C show one embodiment in which an electronic key is accommodated in an electronic key accommodator of an electronic key operation device without using a key case.
Figure 14B:
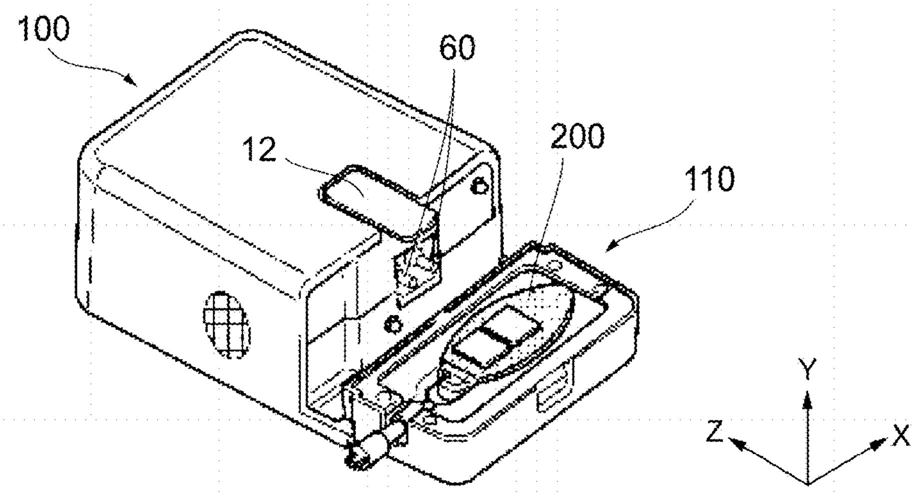
Figure 14C:
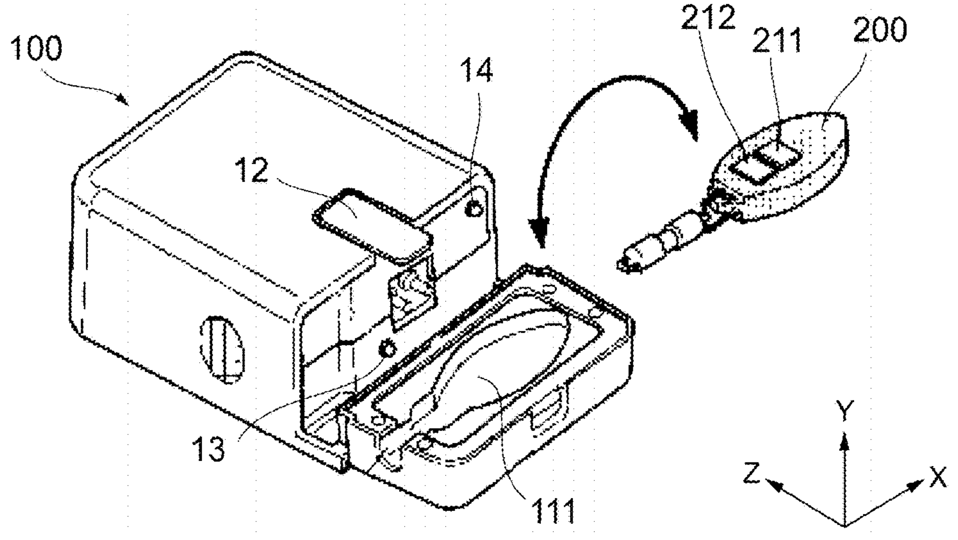

FIGS. 14A to 14C specifically show the fourth embodiment. In the fourth embodiment, the electronic key 200 is directly stored in the openable and closable electronic key accommodator 110.

In the fourth embodiment, the electronic key accommodator 110 can be opened and closed by swinging with respect to the operation mechanism portion 120. When an opening or closing operation part 12 provided on the upper housing 11 is operated, the connection between the upper housing 11 and the electronic key accommodator 110 is released, and the electronic key accommodator 110 can be opened and closed. The closed state shown in FIG. 14A is changed to the open state shown in FIG. 14B. In the open state, the electronic key accommodator 110 opens to a posture in which the accommodated electronic key 200 is exposed upward.

An accommodation recess 111 is formed in the electronic key accommodator 110. The accommodation recess 111 accommodates the electronic key 200 with the unlocking button 211 or the locking button 212 facing upward.

Also in the embodiment, the electronic key operation device 100 can include the accommodation detection part 13 for detecting that the electronic key 200 is accommodated in the electronic key accommodator 110. In the embodiment, the accommodation detection part 13 can detect that the electronic key 200 is accommodated in the electronic key accommodator 110 in the closed state and output the detection signal to the control unit 30.

The electronic key operation device 100 can include an opening and closing detection unit 14 of the openable and closable electronic key accommodator 110. The opening and closing detection unit 14 detects the open state and the closed state of the electronic key accommodator 110 and outputs the detection signal to the control unit 30. The opening and closing detection unit 14 may be, for example, a push switch provided on a side surface of the operation mechanism portion 120 on the Y-axis positive side.

Fifth Embodiment

In a fifth embodiment, the electronic key operation device 100 is a device for operating an electronic key other than an electronic key of a vehicle, for example, a residential smart lock. The electronic key operation device 100 is useful in general applications in which electronic key delivery becomes a security problem.

According to the present specification, the following aspects are provided.

Aspect 1

The electronic key operation device 100 according to Aspect 1 includes: the accommodation unit 110 configured to accommodate the electronic key 200; the pressing member 60 configured to press the button 210 of the electronic key 200 accommodated in the accommodation unit 110; the actuator 40 configured to apply power for pressing the button 210 to the pressing member 60; and a position setting part 70 configured to set a relative position between the actuator and the pressing member and set a position of the pressing member 60 so as to correspond to a position of the button 210.

According to the electronic key operation device 100, since the position of the pressing member 60 can be set by the position setting part 70 while the position of the actuator 40 is fixed, the position of the pressing member 60 and the position of the button 210 of the electronic key 200 can be easily matched. Accordingly, the electronic key operation device 100 can be used by a design change of the minimum limit for various electronic keys 200. In addition, since it is not necessary to change the position of the actuator 40 according to the position of the button 210 of the electronic key 200, it is not necessary to change a shape of the housing 10 of the electronic key operation device 100, and it is not necessary to secure a space inside for changing the position of the actuator 40, so that it is possible to reduce the size.

Aspect 2

In the electronic key operation device 100 according to Aspect 2, the position setting part 70 includes a plurality of receiving portions 73 for accommodating the pressing member 60. In such an aspect, it is not necessary to finely adjust the position of the pressing member 60, and the position of the pressing member 60 may be set at any one of a plurality of positions of the position setting part 70. Therefore, if it is checked in advance at which position of the position setting part 70 the pressing member 60 is to be set for the electronic key 200 of a specific vehicle type, the position of the pressing member 60 can be set very easily.

Aspect 3

In the electronic key operation device 100 according to Aspect 3, the pressing member 60 is slidable in the receiving portion 73 of the position setting part 70, the button 210 is capable of being pressed at one end of the pressing member 60, and the power for pressing the button 210 is applied at the other end thereof. In such an aspect, the pressing member 60 can be substantially perpendicular to the button 210 of the electronic key 200, and the button 210 can be more reliably pressed.

Aspect 4

The electronic key operation device 100 according to Aspect 4 further includes: the intermediate member 50 for transmitting the power from the actuator 40 to the pressing member 60. In such an aspect, the arrangement of the actuator 40, the pressing member 60, and the position setting part 70 can be easily set freely, which facilitates the size reduction of the electronic key operation device 100.

Aspect 5

In the electronic key operation device 100 according to Aspect 5, the intermediate member 50 has a rotary shaft, and the power from the actuator 40 is transmitted to the pressing member 60 by a movement of the intermediate member 50 in a circumferential direction. In such an aspect, a principle of lever can be applied to the power transmitted from the actuator 40 to the pressing member 60. The principle of lever works to reduce a pressing force required for the movable portion 43. As a result, a small-sized actuator having a small output can be adopted as the actuator 40, and as a result, the electronic key operation device 100 itself can also be reduced in size.

Aspect 6

In the electronic key operation device 100 according to Aspect 6, the position setting part 70 is a member separate from the intermediate member 50. In such an aspect, the electronic key operation device 100 can be easily manufactured by incorporating only the position setting part 70, in a state in which the position of the pressing member 60 is set, into the electronic key operation device 100.

Aspect 7

In the electronic key operation device 100 according to Aspect 7, the electronic key 200 is accommodated in the accommodation unit 110 in a state of being fixed by the electronic key accommodation case 300. In such an aspect, if only the design of the electronic key accommodation case 300 is changed in accordance with the shape of the electronic key 200, it is not necessary to change the design of the electronic key operation device 100, which is useful.

REFERENCE SIGNS LIST

3: sharing system
5: vehicle
10: housing
11: upper housing
12: opening and closing operation portion
13: accommodation detection part
14: opening and closing detection unit
30: control unit
40, 41, 42: actuator
43: movable portion
50, 51, 52: intermediate member
53: rotary shaft
60, 61, 62: pressing member
63: flange
64: return mechanism
70: position setting part
71: front portion
72: rear portion
73: receiving portion
100: electronic key operation device
110: electronic key accommodator
120: operation mechanism portion
200: electronic key
210: button
211: unlocking button
212: locking button
300: electronic key accommodation case
310: storage portion
320: key fitter
330: lid portion

The invention claimed is:

1. An electronic key operation device comprising:
an accommodator configured to accommodate an electronic key;
a pressing member configured to press a button of the electronic key accommodated in the accommodator;
an actuator configured to apply power for pressing the button to the pressing member; and
a position setting part configured to set a relative position between the actuator and the pressing member and set a position of the pressing member so as to correspond to a position of the button, wherein
the position setting part includes a plurality of receiving portions formed in the position setting part, each of the receiving portions configured to hold the pressing member so that the pressing member is slidable in a direction in which the pressing member presses the button of the electronic key,
the plurality of receiving portions are arranged in both a width direction of the electronic key when accommodated in the accommodator and a direction intersecting with the width direction of the electronic key when accommodated in the accommodator, and
the pressing member is configured to be set in any one of the plurality of receiving portions to set a position of the pressing member in both the width direction of the electronic key when accommodated in the accommodator and the direction intersecting with the width direction of the electronic key when accommodated in the accommodator.

2. The electronic key operation device according to claim 1, wherein the button is capable of being pressed at one end of the pressing member in which the pressing member is set and the power for pressing the button is applied at the other end thereof.

3. The electronic key operation device according to claim 1, further comprising:
an intermediate member for transmitting the power from the actuator to the pressing member.

4. The electronic key operation device according to claim 3, wherein the intermediate member has a rotary shaft, and the power from the actuator is transmitted to the pressing member by a movement of the intermediate member in a circumferential direction.

5. The electronic key operation device according to claim 3, wherein the position setting part is a member separate from the intermediate member.

6. The electronic key operation device according to claim 1, wherein the accommodator includes an electronic key accommodation case configured to accommodate the electronic key in a state of being fixed.

7. The electronic key operation device according to claim 6, further comprising a housing, wherein
the accommodator, the pressing member, the actuator, and the position setting part are all situated within the housing, and
the electronic key accommodation case is removable with respect to the accommodator.

8. The electronic key operation device according to claim 1, wherein
the pressing member includes a cylindrical pin, and
the position setting part includes a plurality of circular holes each configured to receive the cylindrical pin.

9. The electronic key operation device according to claim 1, wherein the position setting part comprises a front portion and a rear portion.

10. The electronic key operation device according to claim 9, wherein the pressing member is held in a space defined between the front portion and the rear portion.

11. The electronic key operation device according to claim 10, wherein the pressing member includes a flange located within the space.

12. The electronic key operation device according to claim 11, wherein the flange is configured to prevent the pressing member from coming out of the position setting part.

13. The electronic key operation device according to claim 11, further comprising a return mechanism located in the space and configured to interact with the flange.

14. The electronic key operation device according to claim 9, wherein the front portion and the rear portion are configured to be assembled to sandwich and hold the pressing member.

15. The electronic key operation device according to claim 1, further comprising a return mechanism configured to return the pressing member to an original position after pressing the button.

16. The electronic key operation device according to claim 15, wherein the return mechanism is a return spring.

17. The electronic key operation device according to claim 16, wherein the pressing member includes a flange, and the return mechanism is positioned between the flange and a portion of the position setting part.

18. The electronic key operation device according to claim 1, wherein the pressing member is a first pressing member, and the electronic key operation device further comprises a second pressing member accommodated in the position setting part.

19. The electronic key operation device according to claim 1, wherein the pressing member is slidable within the position setting part in a direction to press the button.

* * * * *